United States Patent
Cypher et al.

(10) Patent No.: US 8,117,393 B2
(45) Date of Patent: Feb. 14, 2012

(54) SELECTIVELY PERFORMING LOOKUPS FOR CACHE LINES

(75) Inventors: Robert E. Cypher, Saratoga, CA (US); Haakan E. Zeffer, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 724 days.

(21) Appl. No.: 12/270,685

(22) Filed: Nov. 13, 2008

(65) Prior Publication Data

US 2010/0122032 A1    May 13, 2010

(51) Int. Cl.
  G06F 12/00    (2006.01)
  G06F 13/00    (2006.01)
  G06F 13/28    (2006.01)
(52) U.S. Cl. .................................................. 711/122
(58) Field of Classification Search .................. 711/122
  See application file for complete search history.

(56) References Cited

U.S. PATENT DOCUMENTS

| | | | |
|---|---|---|---|
| 6,430,654 B1 * | 8/2002 | Mehrotra et al. | 711/118 |
| 2008/0313404 A1 * | 12/2008 | Tago et al. | 711/122 |
| 2009/0204769 A1 * | 8/2009 | Heil et al. | 711/139 |

* cited by examiner

Primary Examiner — Kevin Ellis
Assistant Examiner — Chad Davidson
(74) Attorney, Agent, or Firm — Park, Vaughan, Fleming & Dowler LLP; Anthony P. Jones (57) ABSTRACT

Embodiments of the present invention provide a system that selectively performs lookups for cache lines. During operation, the system by maintains a lower-level cache and a higher-level cache in accordance with a set of rules that dictate conditions under which cache lines are held in the lower-level cache and the higher-level cache. The system next performs a lookup for cache line A in the lower level cache. The system then discovers that the lookup for cache line A missed in the lower-level cache, but that cache line B is present in the lower-level cache. Next, in accordance with the set of rules, the system determines, without performing a lookup for cache line A in the higher-level cache, that cache line A is guaranteed not to be present and valid in the higher-level cache because cache line B is present in the lower-level cache.

20 Claims, 5 Drawing Sheets

SELECTIVELY PERFORMING LOOKUPS FOR CACHE LINES

BACKGROUND

1. Field of the Invention

The present invention relates to techniques for improving the performance of computer systems. More specifically, the present invention relates to a method and an apparatus for selectively performing lookups for cache lines in a computer system.

2. Related Art

Virtually all modern computer systems include a memory hierarchy that contains one or more levels of cache along with random-access memory (RAM) for storing instructions and data. For example, many computer systems include a processor chip with on-die L1 and L2 caches which communicate with off-chip main memory (i.e., random-access memory (RAM)).

In such computer systems, when performing a lookup for a cache line, if the cache line is not present in the cache, the lookup is forwarded to the next level of the memory hierarchy. For example, if a cache line is not present in the L2 cache, the lookup is forwarded to the main memory. Unfortunately, forwarding lookup requests consumes memory-system bandwidth. In addition, because a lookup request takes a longer time to return from higher levels of the memory hierarchy, forwarding such requests to higher levels of the memory hierarchy increases the latency of the memory access.

SUMMARY

Figure 1A:
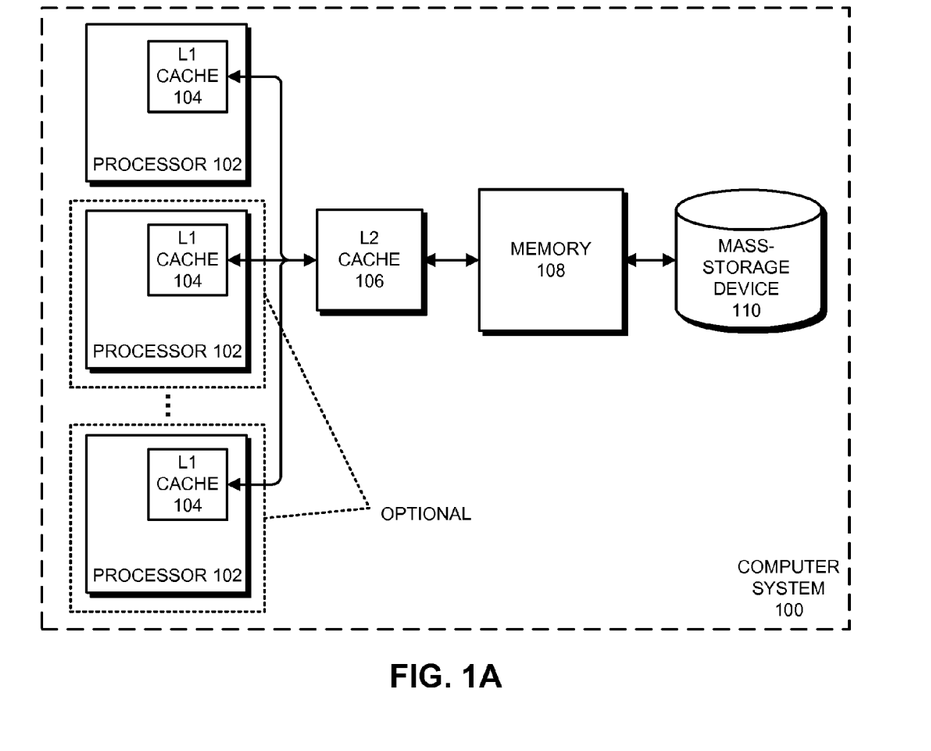
FIG. 1A presents a block diagram of a computer system in accordance with embodiments of the present invention.
Figure 1B:
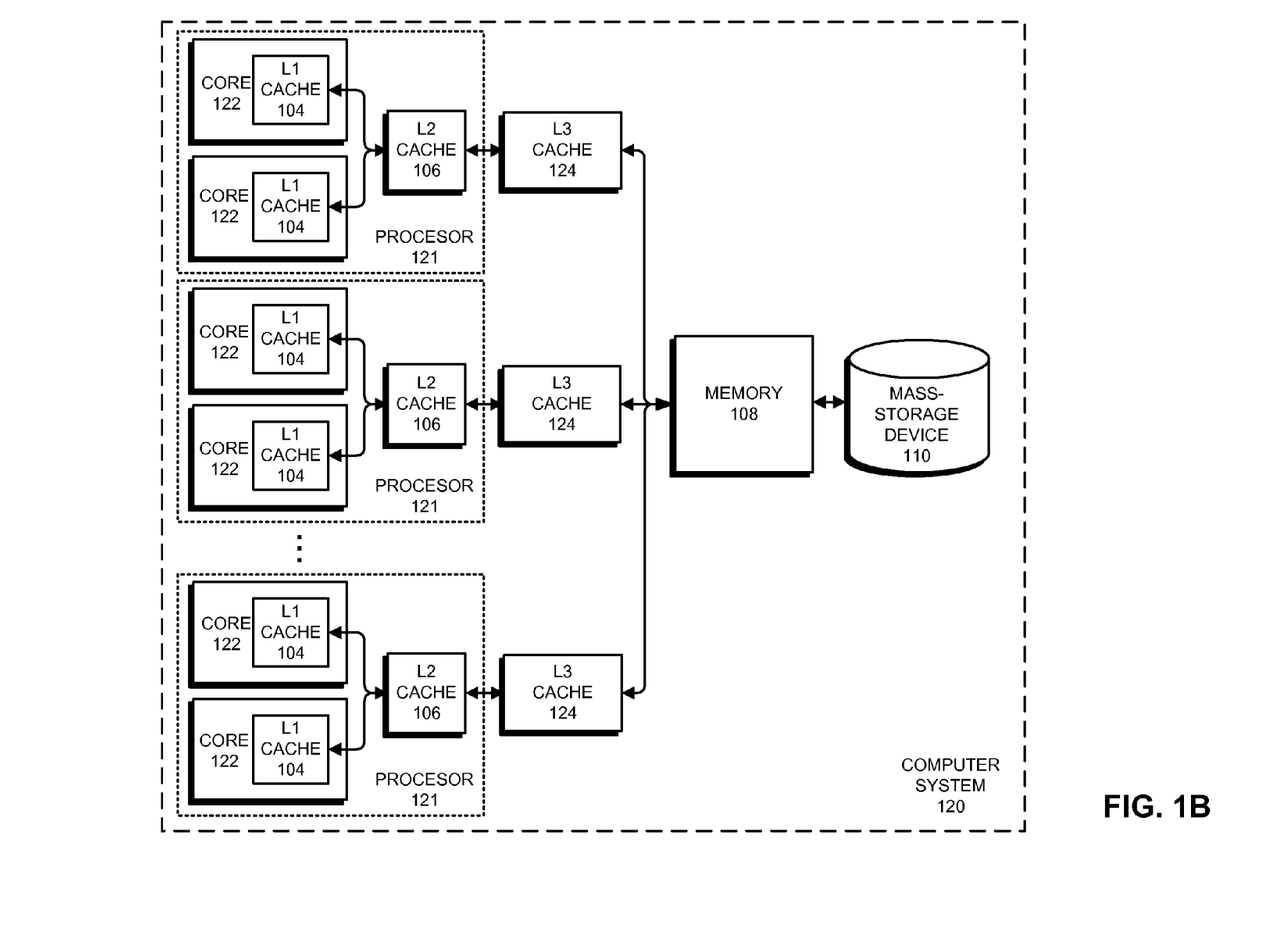
FIG. 1B presents a block diagram illustrating a computer system with multi-core processors in accordance with embodiments of the present invention.

Embodiments of the present invention provide a system (e.g., computer system 120 in FIG. 1) that selectively performs lookups for cache lines. During operation, the system maintains a lower-level cache and a higher-level cache in accordance with a set of rules that dictate conditions under which cache lines are held in the lower-level cache and the higher-level cache. The system next performs a lookup for cache line A in the lower level cache. The system then discovers that the lookup for cache line A missed in the lower-level cache, but that cache line B is present in the lower-level cache. Next, in accordance with the set of rules, the system determines, without performing a lookup for cache line A in the higher-level cache, that cache line A is guaranteed not to be present and valid in the higher-level cache because cache line B is present in the lower-level cache.

In some embodiments, maintaining the lower-level cache and the higher-level cache in accordance with the set of rules involves ensuring that: (1) in the higher-level cache, cache line A and cache line B must map to the same location; (2) any two cache lines that map to the same location in the higher-level cache map to the same set in the lower-level cache; (3) any cache line in the lower-level cache which can be victimized from the lower-level cache is allocated in the higher-level cache; and (4) a set of cache lines exist in the lower-level cache for which it can be determined, without accessing the higher-level cache, that the cache line is also allocated in the higher-level cache.

In some embodiments, placing a cache line into the lower-level cache involves logically allocating the cache line in the higher-level cache.

In some embodiments, ensuring that the set of cache lines exist in the lower-level cache for which it can be determined, without accessing the higher-level cache, that the cache line is also allocated in the higher-level cache involves ensuring that: (1) all cache lines allocated in the lower-level cache are also allocated in the higher-level cache; (2) all cache lines allocated in the lower-level cache from a predefined range of physical addresses are also allocated in the higher-level cache; or (3) state information associated with each cache line in the lower-level cache indicates whether or not the cache line is allocated in the higher-level cache.

In some embodiments, upon determining that cache line A is guaranteed not to be present and valid in the higher-level cache, the system: (1) victimizes cache line B from the higher-level cache and allocates the location in the higher-level cache to cache line A; (2) victimizes cache line B from the lower-level cache and allocates the location in the lower-level cache to cache line A; and (3) places cache line A in the lower-level cache but not in the allocated location in the higher-level cache.

In some embodiments, upon determining that cache line A is guaranteed not to be present and valid in the higher-level cache, the system: (1) victimizes cache line B from the higher-level cache and allocates the location in the higher-level cache for cache line A; (2) victimizes cache line B from the lower-level cache and allocates the location in the lower-level cache for cache line A; and (3) places cache line A in the lower-level cache and in the higher-level cache.

In some embodiments, upon determining that a copy of cache line A is guaranteed not to be present and valid in the higher-level cache, the system: (1) victimizes cache line B from the lower-level cache and allocates the location in the lower-level cache for cache line A; (2) places cache line A in the lower-level cache; and (3) leaves cache line B in the higher-level cache.

In some embodiments, the system receives a lookup request for cache line A that is directed to a lower-level cache. In response to this request, the system can return a response indicating that cache line A is not present and valid in either the lower-level cache or the higher-level cache

For a better understanding of the aforementioned embodiments of the present invention as well as additional embodiments thereof, reference should be made to the detailed description of these embodiments below, in conjunction with the figures in which like reference numerals refer to corresponding parts throughout.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The methods and processes described below can be included in hardware modules. For example, the hardware modules can include, but are not limited to, processor chips, application-specific integrated circuit (ASIC) chips, field-programmable gate arrays (FPGAs), memory chips, and other programmable-logic devices now known or later developed. When the hardware modules are activated, the hardware modules perform the methods and processes included within the hardware modules.

Terminology

Throughout the description, we use the following terminology in describing embodiments of the present invention. These terms are generally known in the art, but are defined below to clarify the subsequent descriptions.

The term "bandwidth" refers to the capacity of a communication link which carries communications between two or more devices. For example, the bandwidth of a communication link can be the number of communications per second (or bytes per second) that can be transferred across the communication link.

The term "victimization" refers to the eviction of a cache line from a cache because the associated location in the cache is being allocated to another cache line. For example, when a cache location which contains cache line A is allocated to cache line B and cache line A is subsequently removed from the cache (e.g., written back to a higher-level cache), cache line A is said to be "victimized." Note that the invalidation of a cache line in order to maintain cache coherence is not classified as victimization.

The term "dirty" when applied to a cache line in a cache indicates that the value of the cache line in that cache may not match the value of the cache line in the next higher level of the memory hierarchy. A cache line can be dirty in a cache because it has been modified (written to) in that cache or because it has been placed in that cache but not in the next higher level of the memory hierarchy.

A number of terms are used throughout this description to specify operations involving cache lines and/or caches. For example: (1) "placing a cache line in a cache" means to store a copy of a cache line in a corresponding location in a cache; (2) "performing a lookup for a cache line in a cache" means to query a cache to determine if a given cache line is present in the cache; and (3) "writing back a cache line" means to write a dirty cache line to a higher level of the memory hierarchy. Because there exist a number of different well-known techniques for performing each of these types of operations, such operations are not described in further detail.

Generally, "allocating a location in a cache" means to reserve a location in a cache for a cache line. However, given a direct-mapped cache, we can refer to a cache line B as being "allocated" in the cache if no other cache line which is dirty exists in the location in the cache to which cache line B maps.

Generally, when a cache line is "present" in a cache, a copy of the cache line physically resides at a corresponding location in the cache. However, in embodiments of the present invention, a cache line can be "present" in a cache, but invalid (and therefore unusable). Specifically, cache line B can be allocated to a location in a cache (e.g., a higher-level cache as discussed in detail below), but a clean copy of cache line A can be physically present in the cache. As described below, this situation can arise in embodiments where cache line B is placed in a lower-level cache and is allocated in, but not written to, the higher-level cache. Because cache line B is allocated in, but not written to, the higher-level cache, a copy of cache line A remains physically resident in the location in the higher-level cache, but not logically resident, and hence cache line A is "present," but is invalid (and may be stale).

The term "valid" as applied to cache lines in this description indicates that the cache line is both physically present and logically resides in the cache. A valid cache line can be accessed (i.e., read or written) in accordance with a cache coherency protocol in the system.

Computer System

FIG. 1A presents a block diagram of a computer system 100 in accordance with embodiments of the present invention. Computer system 100 includes processor 102, L1 cache 104, L2 cache 106, memory 108, and mass-storage device 110.

Processor 102 can be a general-purpose processor that performs computational operations. For example, processor 102 can be a central processing unit (CPU), such as a microprocessor, a controller, or an application-specific integrated circuit. Note that there are numerous possible CPU architectures (e.g., reduced instruction set computer (RISC), complex instruction set computer (CISC), superscalar, or multi-threaded) for processor 102. Such CPU architectures are well-known in the art and, hence, are not described in further detail.

As shown in FIG. 1A, in some embodiments of the present invention, computer system 100 optionally includes two or more processors 102. In these embodiments, each processor is a separate general-purpose processor that performs computational operations (as described above). In these embodiments, some or all of L2 cache 106, memory 108, and mass-storage device 110 can be shared between the two or more processors 102. Such computer systems are well-known in the art and, hence, are not described in further detail.

In some embodiments of the present invention, each processor 121 (see FIG. 1B) is a multi-core processor that includes two or more separate processor cores 122 integrated into a single semiconductor die (i.e., a chip-level multiprocessor). Alternatively, processor 121 can include two or more separate semiconductor dies, each including one or more processor cores 122 integrated in one package. In these embodiments, each processor core 122 functions as a separate general-purpose processor that performs computational operations.

FIG. 1B presents a block diagram illustrating a computer system 120 that includes multi-core processors in accordance with embodiments of the present invention. As can be seen in FIG. 1B, each processor 121 includes a number of processor cores 122 and an L2 cache 106 that is shared by the cores 122. Computer system 120 also includes a separate L3 cache 124 for each processor 121 and shared memory 108 and mass-storage device 110. Note that although computer system 120 is shown with three processors 121 with two cores each, computer system 120 can include a different number of processors 121 and/or a different number of cores 122 per processor 121. Computer systems such as computer system 120 are known in the art and, hence, are not described in further detail.

In the following description, we describe embodiments of the present invention with reference to exemplary computer system 120. However, aspects of these embodiments can also be applied to computer system 100.

Mass-storage device 110 is a high-capacity, non-volatile computer-readable storage device, such as a disk drive or a large flash memory, with a large access time. Memory 108, L3 cache 124, L2 cache 106, and L1 cache 104 are computer-readable storage devices that collectively form a memory hierarchy that stores data and instructions for each processor 121. In comparison to mass-storage device 110, L1 cache 104, L2 cache 106, L3 cache 124, and memory 108 are smaller, faster memories that store copies of frequently used data. For example, memory 108 can be a large dynamic random access memory (DRAM) structure, whereas L1 cache 104, L2 cache 106, and L3 cache 124 can be comprised of smaller static random access memories (SRAM) or DRAMs. In some embodiments, the L3 caches 124 are implemented in DRAM along with memory 108. Portions of the memory hierarchy can be coupled together by a communications link (e.g., a memory bus) that facilitates transferring communications and data between memory 108, L3 cache 124, L2 cache 106, and processor 121/L1 cache 104. Such memory structures are well-known in the art and are therefore not described in further detail.

In some embodiments, computer system 120 includes one or more separate functional blocks (not shown) for controlling the operation of the memory hierarchy. For example, computer system 120 can include a directory, a memory controller, and/or other such circuit structures. In some embodiments, the functional blocks can operate in combination with separate controllers within the elements of the memory hierarchy. For example, in some embodiments, each processor 121 includes one or more memory controllers, cache coherency mechanisms, and/or other functional blocks (not shown) that enable the processors 121 to communicate memory operations (such as cache line accesses) to one another. The functional blocks used to control the operation of the memory hierarchy are well-known in the art and are therefore not described in further detail.

In embodiments of the present invention, L1 cache 104, L2 cache 106, L3 cache 124, and memory 108 are logically partitioned into a number of cache lines for storing data. Starting from memory 108 and proceeding to L1 cache 104 (right to left in FIGS. 1A and 1B), each level of the memory hierarchy contains fewer cache lines than the next higher level.

In some embodiments of the present invention, some or all of the caches are "set-associative." Generally, in a set-associative cache, the entries in the cache are logically divided into a number of "sets." A "set" is a group of cache entries that are used to store cache lines from the same predetermined range of physical addresses. In some embodiments of the present invention, some or all of the caches are "direct-mapped." In these embodiments, a separate range of physical addresses maps to each entry in the cache.

Computer system 120 can be incorporated into many different types of electronic devices. For example, computer system 120 can be part of a desktop computer, a laptop computer, a server, a media player, an appliance, a cellular phone, testing equipment, a network appliance, a calculator, a personal digital assistant (PDA), a hybrid device (e.g., a "smart phone"), a guidance system, audio-visual equipment, a toy, a control system (e.g., an automotive control system), or another electronic device.

Although we describe computer system 120 as comprising specific components, in alternative embodiments different components can be present in computer system 120. For example, in some embodiments, computer system 120 can include video cards, network cards, optical drives, and/or other peripheral devices that are coupled to each processor 121 using a bus, a network, or another suitable communication link.

Selectively Performing Lookups for Cache Lines

Embodiments of the present invention selectively perform lookups for cache lines, which enables computer system 120 to avoid forwarding some lookup requests to higher levels of the memory hierarchy. More specifically, in embodiments of the present invention, a set of rules enables computer system 120 to determine that because the cache line is not present in a lower-level cache, the cache line is also not present and valid in a higher-level cache. Because computer system 120 can determine from the lower-level cache that the cache line is not present and valid in the higher-level cache, computer system 120 can avoid forwarding a lookup request for the cache line to the higher-level cache.

In these embodiments, the rules are as follows:
1. The higher-level cache is direct-mapped and in the higher-level cache, cache line A and cache line B must map to the same location.
2. Any two cache lines A and B that map to the same location in the higher-level cache map to the same set in the lower-level cache.
3. Any cache line B in the lower-level cache which can be victimized to a higher-level cache has already been allocated in the higher-level cache.
4. A cache line B can reside in the lower-level cache for which it can be determined without accessing the higher-level cache that cache line B is also allocated in the higher-level cache.

Under rule two, the lower-level cache can be set-associative, direct-mapped, or fully-associative. (In the case where the lower-level cache is fully-associative, the lower-level cache can be viewed as being set-associative with only one set.)

Under rule three, cache lines are "allocated early" in the higher-level cache. In these embodiments, when a cache line is placed into the lower-level cache, the cache line is logically allocated in the higher-level cache.

In addition, under rule three, no other cache line C which is dirty with respect to a level of the memory hierarchy immediately above the higher-level cache can reside in the location in the higher-level cache to which cache line B maps. Thus, a cache line C can reside in the higher-level cache, but must be clean with respect to the next-higher level of the memory hierarchy, so that cache line C can be overwritten in the higher-level cache in the event that cache line B is victimized (i.e., written back from the lower-level cache to the higher-level cache).

In order to enable rule four, in some embodiments of the present invention all cache lines in the lower-level cache must also be allocated in the higher-level cache. In alternative embodiments, one or more predetermined ranges of physical addresses are defined such that all cache lines in the lower-level caches that fall within those address ranges are also allocated in the higher-level cache. In alternative embodiments, state information associated with each cache line in the lower-level cache indicates whether or not that cache line is allocated in the higher-level cache. This state information can be included in metadata in each cache line or can be located in a directory or elsewhere in computer system 120.

These rules generally apply to cache lines in the lower-level cache that can possibly be victimized. In some embodiments, this includes all the cache lines in the lower-level cache. In other embodiments, this includes one or more subsets of the cache lines in the lower-level cache.

These rules effectively limit the number of requests that are sent to higher-level caches, which reduces the latency of the associated cache accesses, thereby improving the performance of computer system 120. In addition, the rules can reduce the bandwidth required for certain cache accesses, thereby saving power and potentially improving performance. Note that the bandwidth savings are particularly noticeable where the higher-level cache is implemented in DRAM, because DRAM accesses incur high latency and require significant amounts of power.

Example of Filtering Cache Line Accesses

The following example describes the operation of some embodiments of the present invention in light of the above-described rules. This example applies to a portion of the memory hierarchy of computer system 120 which includes a lower-level cache and a higher-level cache. For example, L2 cache 106 can be the lower-level cache, and L3 cache 124 can be the higher-level cache.

First, the system performs a lookup in the lower-level cache for a cache line A. The lookup misses in the lower-level cache, but the system discovers that there is another cache line B present in the lower-level cache which can be victimized to the higher-level cache and which maps to the same location in the higher-level cache as cache line A. In accordance with rule three, cache line B is also allocated in the higher-level cache. Thus, it can be assumed that cache line A is not present and valid in the higher-level cache because cache line B is allocated to the location in the higher-level cache that cache line A would have occupied. As a result, there is no need to perform a lookup for cache line A in the higher-level cache, because such a lookup is guaranteed to miss. As a result, the lookup for cache line A in the higher-level cache can be avoided, thereby reducing the latency and bandwidth required to access cache line A. Note that cache line A may be physically present in the higher-level cache as a clean (read only) copy without affecting the example.

Handling Cache Lines

In the event that a cache line B is determined to be present in the lower-level cache (as described above), thus indicating that cache line A is not present and valid in the higher-level cache, some embodiments of the present invention allocate space in the higher-level cache for cache line A and place cache line A in the lower-level cache. These embodiments operate as follows.

Upon determining that cache line A is missing from the lower-level cache and that cache line B is instead present in the lower-level cache, cache line B is victimized from both the lower-level cache and the higher-level cache. If cache line B has been modified, victimizing cache line B involves writing cache line B back to the next higher level of the memory hierarchy. However, in the event that cache line B must be written back to the next level of the memory hierarchy, there is no need to read the cache line in the higher-level cache to obtain the cache line B's data, because the lower-level cache holds the current data for cache line B. More specifically, because the lookup for cache line A in the lower-level cache returns the data for cache line B from the lower-level cache, there is no need to read the data from cache line B from the higher-level cache in order to write the data back to the next higher level of the memory hierarchy. (Note that cache line B can also be present in a level of the memory hierarchy below the lower-level cache, in which case the cache line B can be read from that even lower-level cache.)

Furthermore, when these embodiments place cache line A in the lower-level cache, the fact that cache line B was victimized from the higher-level cache means that space was allocated to cache line A in the higher-level cache (without actually writing cache line A to the higher-level cache). Thus, cache line A in the lower-level cache is dirty with respect to the higher-level cache and the corresponding location in the higher-level cache is presently allocated to cache line A. As a result, it is not necessary to separately read from (or write to) the higher-level cache in order to look up cache line A, victimize cache line B, or allocate space to A in the higher-level cache, which saves on bandwidth to the higher-level cache.

Some alternative embodiments of the present invention do not allocate space in the higher-level cache to cache line A. In these embodiments, in order to allocate the space to cache line A in the lower-level cache, it may be necessary to write the victimized cache line B from the lower-level cache to the higher-level cache. However, because it is not necessary to look up cache line A in the higher-level cache, and because rule three applies (i.e., any cache line B in the lower-level cache which can be victimized from the lower-level cache has already been allocated in the higher-level cache), it is not necessary to read the higher-level cache, which saves on bandwidth to the higher-level cache.

Some alternative embodiments leave the dirty cache line B in the higher-level cache and write cache line A only to the lower-level cache. In these embodiments, when cache line A is subsequently victimized from the lower-level cache, cache line B's data will need to be read from the higher-level cache in order to write cache line B's data back to a higher level of the memory hierarchy. These embodiments may be slightly less efficient than the embodiments of the present invention where cache line B is victimized from the higher-level cache when cache line A is placed in the lower-level cache. This is because cache line B's data, which is originally returned during the lookup in the lower-level cache (and thus could have been written to the higher level of the hierarchy at that time), must be re-read from the higher-level cache when cache line A is victimized from the lower-level cache.

Other alternative embodiments immediately victimize cache line B from the higher-level cache and then place cache line A in both the lower-level cache and the higher-level cache. These embodiments are less efficient when cache line A is eventually modified in the lower-level cache, because cache line A must be rewritten to the higher-level cache upon victimizing cache line A.

Processes for Handling Cache Lines

FIGS. 2-6 present flowcharts illustrating the handling of cache lines in accordance with embodiments of the present invention. Note that the processes presented in FIGS. 2-6 are intended to be illustrative. Hence, alternative embodiments perform more or fewer steps in each process and/or perform the operations in different order.

Figure 2:
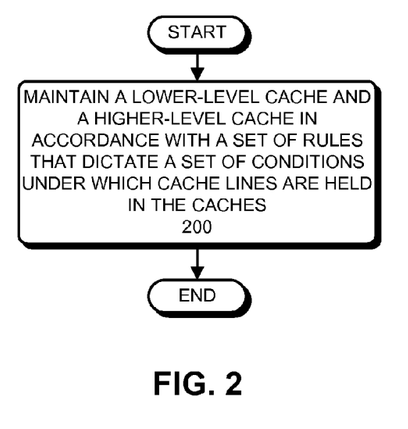
FIG. 2 presents a flowchart illustrating a process of maintaining cache lines in accordance with embodiments of the present invention.

FIG. 2 presents a flowchart illustrating a process of maintaining cache lines in accordance with embodiments of the present invention. The process involves maintaining a lower-level cache and a higher-level cache in accordance with a set of rules that dictate conditions under which cache lines are held in the lower-level cache and the higher-level cache (step 200).

Recall from above that maintaining the caches in accordance with the set of rules involves ensuring that: (1) the higher-level cache is direct-mapped, and in the higher-level cache, cache line A and cache line B map to the same location; (2) any two cache lines A and B that map to the same location in the higher-level cache map to the same set in the lower-level cache; (3) any cache line B in the lower-level cache which can be victimized to the higher-level cache has already been allocated in the higher-level cache; and (4) a cache line B can reside in the lower-level cache for which it can be determined, without accessing the higher-level cache, that cache line B is also allocated in the higher-level cache. By maintaining the cache lines in this way, these embodiments enable the system (e.g., computer system 120) to determine that cache lines are not present and valid in the higher-level cache by examining cache lines located in the lower-level cache.

Figure 3:
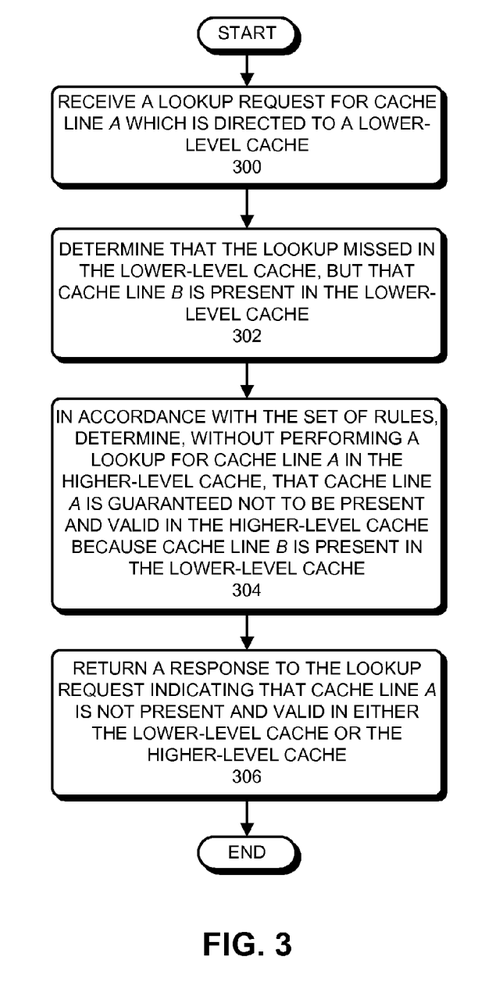
FIG. 3 presents a flowchart illustrating a process of performing a lookup for a cache line in accordance with embodiments of the present invention.

FIG. 3 presents a flowchart illustrating a process for performing a lookup for a cache line in accordance with embodiments of the present invention. The process starts when the system (e.g., computer system 120) receives a lookup request for a cache line A which is directed to a lower-level cache (step 300). This lookup request causes the system to perform a lookup in the lower-level cache for cache line A.

The system then determines that the lookup missed in the lower-level cache, but that cache line B is present in the lower-level cache (step 302). In accordance with the set of rules (described with respect to FIG. 2), the system next determines, without performing a lookup in the higher-level cache, that cache line A is guaranteed not to be present and valid in the higher-level cache because cache line B is present in the lower-level cache (step 304). Note that by maintaining the lower-level cache and the higher-level cache according to the set of rules, the system can avoid forwarding the lookup request to the higher-level cache, thereby not consuming bandwidth in the memory system and not adding latency to the lookup request.

The system then returns a response to the lookup request indicating that cache line A is not present and valid in either the lower-level cache or the higher-level cache (step 306). In some embodiments, responding to the request can involve forwarding the request to the next-higher level of the memory hierarchy (or to mass-storage device 110).

Figure 4:
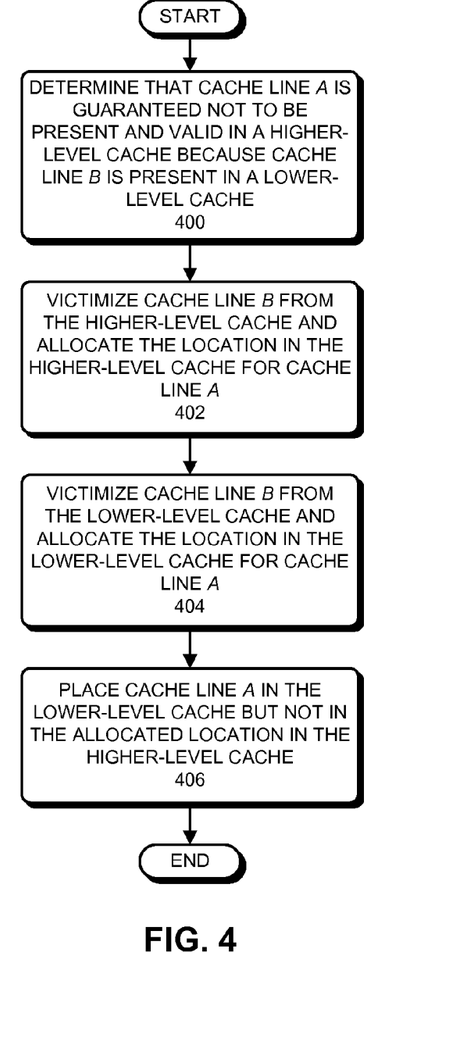
FIG. 4 presents a flowchart illustrating a process for handling cache lines in accordance with embodiments of the present invention.

FIG. 4 presents a flowchart illustrating a process for handling cache lines in accordance with embodiments of the present invention. The process illustrated in FIG. 4 (as well as the processes in FIGS. 5 and 6) are similar to the lookup process described with respect to FIG. 3. More specifically, the initial "determination" operation shown in FIGS. 4-6 involves performing a lookup in a lower-level cache maintained in accordance with the set of rules described with respect to FIG. 2.

Figure 5:
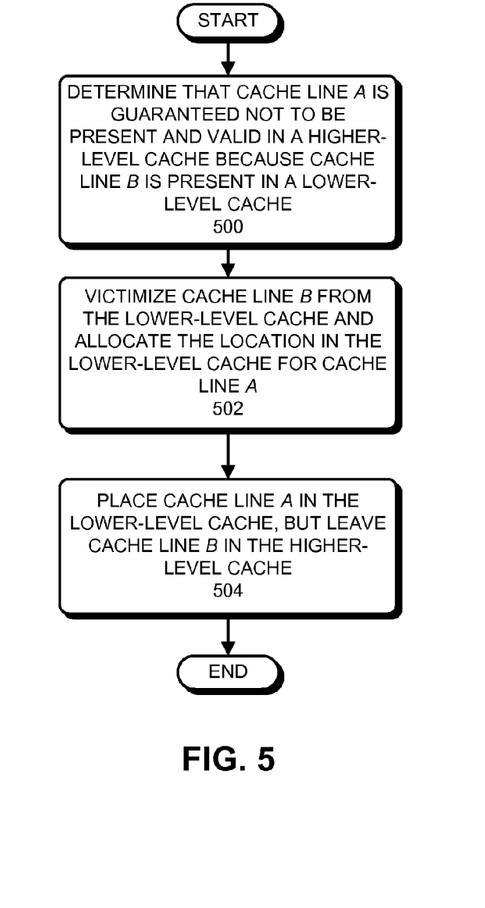
FIG. 5 presents a flowchart illustrating a process for handling cache lines in accordance with embodiments of the present invention.
Figure 6:
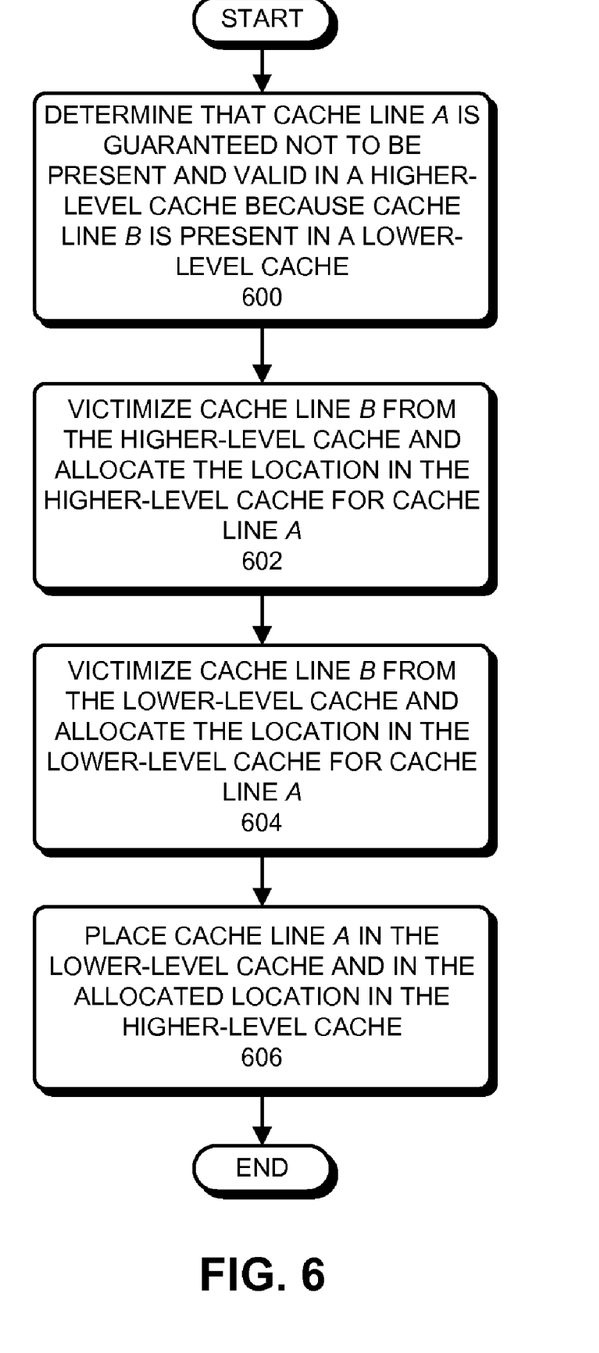
FIG. 6 presents a flowchart illustrating a process for handling cache lines in accordance with embodiments of the present invention.

Note that the processes outlined in FIGS. 4-6 provide alternative processes that can be performed in the event that a cache line is determined to be missing in a lower-level cache. Some embodiments of the present invention dynamically switch between these processes based on operating conditions (e.g., if one process will cause the system to operate more efficiently, then the system can switch to that process).

The process shown in FIG. 4 starts when the system determines that cache line A is guaranteed not to be valid in a higher-level cache because cache line B is valid in a lower-level cache (step 400). The system (e.g., computer system 120) then victimizes cache line B from the higher-level cache and allocates the location in the higher-level cache to cache line A (step 402). (Note that the operation of victimizing cache line B can involve allocating space in the higher-level cache for cache line A.)

The system next victimizes cache line B from the lower-level cache and allocates the location in the lower-level cache for cache line A (step 404). The system then places cache line A in the lower-level cache, but not in the allocated location in the higher-level cache (step 406). By allocating the location in the higher-level cache to cache line A (which can happen as part of the victimization operation), but not actually writing cache line A into the higher-level cache, the system can conserve bandwidth and latency. However, if cache line A is later modified in the lower-level cache, a subsequent write-back of cache line A can require cache line A to be written to the higher-level cache.

FIG. 5 presents a flowchart illustrating a process for handling cache lines in accordance with embodiments of the present invention. The process starts when the system determines that cache line A is guaranteed not to be present and valid in the higher-level cache because cache line B is present in the lower-level cache (step 500).

The system next victimizes cache line B from the lower-level cache and allocates the location in the lower-level cache to cache line A (step 502). The system then places cache line A in the lower-level cache, but leaves cache line B in the higher-level cache (step 504). By not victimizing cache line B from the higher-level cache, the system can conserve bandwidth and latency. However, when cache line A is later victimized from the lower-level cache, cache line A must be written-back to the higher-level cache.

FIG. 6 presents a flowchart illustrating a process for handling cache lines in accordance with embodiments of the present invention. The process starts when the system determines that cache line A is guaranteed not to be present and valid in the higher-level cache because cache line B is present in the lower-level cache (step 600).

The system then victimizes cache line B from the lower-level cache and allocates the location in the lower-level cache to cache line A (step 602). The system next victimizes cache line B from the higher-level cache and allocates the location in the higher-level cache to cache line A (step 604). Note that victimizing cache line B can involve writing cache line B back to the next level of cache (or memory or disk) if cache line B is dirty. Next, the system places cache line A in the lower-level cache and in the allocated location in the higher-level cache (step 606).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively performing lookups for cache lines, comprising:
   maintaining a lower-level cache and a higher-level cache in accordance with a set of rules that dictate conditions under which cache lines are held in the lower-level cache and the higher-level cache;
   performing a lookup for cache line A in the lower level cache;
   determining that the lookup for cache line A missed in the lower-level cache, but that cache line B is present in the lower-level cache; and
   in accordance with the set of rules, determining, without performing a lookup for cache line A in the higher-level cache, that cache line A is guaranteed not to be present and valid in the higher-level cache because cache line B is present in the lower-level cache.

2. The method of claim 1, wherein maintaining the lower-level cache and the higher-level cache in accordance with the set of rules involves ensuring that:
   the higher-level cache is direct-mapped;
   in the higher-level cache, two cache lines can map to a same location;

any two cache lines that map to a same location in the higher-level cache map to a same set in the lower-level cache;

any cache line in the lower-level cache which can be victimized from the lower-level cache is allocated in the higher-level cache; and a set of cache lines exist in the lower-level cache for which it can be determined, without accessing the higher-level cache, that the cache line is also allocated in the higher-level cache.

3. The method of claim 2, wherein placing a cache line into the lower-level cache involves logically allocating the cache line in the higher-level cache.

4. The method of claim 2, wherein ensuring that the set of cache lines exist in the lower-level cache for which it can be determined, without accessing the higher-level cache, that the cache line is also allocated in the higher-level cache involves ensuring that:

all cache lines allocated in the lower-level cache are also allocated in the higher-level cache;

all cache lines allocated in the lower-level cache from a predefined range of physical addresses are also allocated in the higher-level cache; or state information associated with each cache line in the lower-level cache indicates whether or not the cache line is allocated in the higher-level cache.

5. The method of claim 1, wherein upon determining that cache line A is guaranteed not to be present and valid in the higher-level cache, the method further comprises:

victimizing cache line B from the higher-level cache and allocating the location in the higher-level cache for cache line A;

victimizing cache line B from the lower-level cache and allocating the location in the lower-level cache for cache line A; and placing cache line A in the lower-level cache but not in the allocated location in the higher-level cache.

6. The method of claim 1, wherein upon determining that cache line A is guaranteed not to be present and valid in the higher-level cache, the method further comprises:

victimizing cache line B from the higher-level cache and allocating the location in the higher-level cache for cache line A;

victimizing cache line B from the lower-level cache and allocating the location in the lower-level cache for cache line A; and placing cache line A in the lower-level cache and in the higher-level cache.

7. The method of claim 1, wherein upon determining that a copy of cache line A is guaranteed not to be present and valid in the higher-level cache, the method further comprises:

victimizing cache line B from the lower-level cache and allocating the location in the lower-level cache for cache line A;

placing cache line A in the lower-level cache; and leaving cache line B in the higher-level cache.

8. The method of claim 1, wherein the method further comprises:

receiving a lookup request for cache line A that is directed to a lower-level cache, wherein the lookup operation is performed in response to the request; and returning a response to the lookup request that cache line A is not present and valid in either the lower-level cache or the higher-level cache.

9. An apparatus for selectively performing lookups for cache lines, comprising:

a lower-level cache;

a higher-level cache coupled to the lower-level cache;

wherein the apparatus is configured to:

maintain the lower-level cache and the higher-level cache in accordance with a set of rules that dictate conditions under which cache lines are held in the lower-level cache and the higher-level cache;

perform a lookup for cache line A in the lower level cache;

determine that the lookup for cache line A missed in the lower-level cache, but that cache line B is present in the lower-level cache; and in accordance with the set of rules, determine, without performing a lookup for cache line A in the higher-level cache, that cache line A is guaranteed not to be present and valid in the higher-level cache because cache line B is present in the lower-level cache.

10. The apparatus of claim 9, wherein when maintaining the lower-level cache and the higher-level cache in accordance with the set of rules, the apparatus is configured to ensure that:

the higher-level cache is direct-mapped;

in the higher-level cache, two cache lines can map to a same location;

any two cache lines that map to the same location in the higher-level cache map to a same set in the lower-level cache;

any cache line in the lower-level cache which can be victimized from the lower-level cache is allocated in the higher-level cache; and a set of cache lines exist in the lower-level cache for which it can be determined, without accessing the higher-level cache, that the cache line is also allocated in the higher-level cache.

11. The apparatus of claim 10, wherein when placing a cache line into the lower-level cache, the apparatus is configured to logically allocate the cache line in the higher-level cache.

12. The apparatus of claim 10, wherein when ensuring that the set of cache lines exist in the lower-level cache for which it can be determined, without accessing the higher-level cache, that the cache line is also allocated in the higher-level cache, the apparatus is configured to ensure that:

all cache lines allocated in the lower-level cache are also allocated in the higher-level cache;

all cache lines allocated in the lower-level cache from a predefined range of physical addresses are also allocated in the higher-level cache; or state information associated with each cache line in the lower-level cache indicates whether or not the cache line is allocated in the higher-level cache.

13. The apparatus of claim 9, wherein upon determining that cache line A is guaranteed not to be present and valid in the higher-level cache, the apparatus is configured to:

victimize cache line B from the higher-level cache and allocate the location in the higher-level cache for cache line A;

victimize cache line B from the lower-level cache and allocate the location in the lower-level cache for cache line A; and place cache line A in the lower-level cache but not in the allocated location in the higher-level cache.

14. The apparatus of claim 9, wherein upon determining that cache line A is guaranteed not to be present and valid in the higher-level cache, the apparatus is configured to:

victimize cache line B from the higher-level cache and allocate the location in the higher-level cache for cache line A;

victimize cache line B from the lower-level cache and allocate the location in the lower-level cache for cache line A; and place cache line A in the lower-level cache and in the higher-level cache.

15. The apparatus of claim 9, wherein upon determining that a copy of cache line A is guaranteed not to be present and valid in the higher-level cache, the apparatus is configured to:

victimize cache line B from the lower-level cache and allocate the location in the lower-level cache for cache line A;

place cache line A in the lower-level cache; and leave cache line B in the higher-level cache.

16. The apparatus of claim 9, wherein the apparatus is further configured to:

receive a lookup request for cache line A that is directed to a lower-level cache, wherein the apparatus is configured to perform the lookup operation in response to the request; and return a response to the lookup request that cache line A is not present and valid in either the lower-level cache or the higher-level cache.

17. A computer system for selectively performing lookups for cache lines, comprising:

a processor;

a lower-level cache and a higher-level cache coupled to the processor, wherein the lower-level cache and the higher-level cache store instructions and data for the processor;

wherein the computer system is configured to:

maintain the lower-level cache and the higher-level cache in accordance with a set of rules that dictate conditions under which cache lines are held in the lower-level cache and the higher-level cache;

perform a lookup for cache line A in the lower level cache;

determine that the lookup for cache line A missed in the lower-level cache, but that cache line B is present in the lower-level cache; and in accordance with the set of rules, determine, without performing a lookup for cache line A in the higher-level cache, that cache line A is guaranteed not to be present and valid in the higher-level cache because cache line B is present in the lower-level cache.

18. The computer system of claim 17, wherein when maintaining the lower-level cache and the higher-level cache in accordance with the set of rules, the computer system is configured to ensure that:

the higher-level cache is direct-mapped;

in the higher-level cache, two cache lines can map to a same location;

any two cache lines that map to the same location in the higher-level cache map to a same set in the lower-level cache;

any cache line in the lower-level cache which can be victimized from the lower-level cache is allocated in the higher-level cache; and a set of cache lines exist in the lower-level cache for which it can be determined, without accessing the higher-level cache, that the cache line is also allocated in the higher-level cache.

19. The computer system of claim 18, wherein when placing a cache line into the lower-level cache, the computer system is configured to logically allocate the cache line in the higher-level cache.

20. The computer system of claim 18, wherein when ensuring that the set of cache lines exist in the lower-level cache for which it can be determined, without accessing the higher-level cache, that the cache line is also allocated in the higher-level cache, the computer system is configured to ensure that:

all cache lines allocated in the lower-level cache are also allocated in the higher-level cache;

all cache lines allocated in the lower-level cache from a predefined range of physical addresses are also allocated in the higher-level cache; or state information associated with each cache line in the lower-level cache indicates whether or not the cache line is allocated in the higher-level cache.

* * * * *